United States Patent [19]

Ishihara et al.

[11] Patent Number: 4,692,378

[45] Date of Patent: Sep. 8, 1987

[54] MAGNETIC RECORDING MEDIA

[75] Inventors: Heigo Ishihara, Tokyo; Tomoyuki Ohno, Kokubunji, both of Japan

[73] Assignee: Hitachi, Ltd., Tokyo, Japan

[21] Appl. No.: 795,261

[22] Filed: Nov. 5, 1985

[30] Foreign Application Priority Data

Nov. 7, 1984 [JP] Japan .................................. 59-233148

[51] Int. Cl.$^4$ .............................................. G11B 5/71
[52] U.S. Cl. ..................................... 428/340; 427/128; 427/131; 427/132; 428/421; 428/422; 428/418; 428/524; 428/694; 428/695; 428/900
[58] Field of Search ............... 428/694, 695, 422, 421, 428/425.9, 900, 418, 524; 427/44, 131, 128, 132; 360/134–136; 252/62.54

[56] References Cited

U.S. PATENT DOCUMENTS

| | | | |
|---|---|---|---|
| 4,213,870 | 7/1980 | Loran | 428/422 |
| 4,268,556 | 5/1981 | Pedrotty | 428/422 |
| 4,327,139 | 4/1982 | Schaefer | 428/695 |
| 4,529,659 | 7/1985 | Hoshino | 428/695 |
| 4,583,145 | 2/1986 | Mönnich | 428/900 |

FOREIGN PATENT DOCUMENTS 85930  5/1983  Japan .................................. 428/323

OTHER PUBLICATIONS

R. W. Lenz, "Org. Chem. of Synthetic High Polymers", pp. 548–550, Interscience Pub., New York, 1967.

*Primary Examiner*—Ellis P. Robinson
*Attorney, Agent, or Firm*—Antonelli, Terry & Wands

[57] ABSTRACT

The invention provides magnetic recording media such as magnetic disks, etc., with an improved lubricant composition of perfluoroalkylpolyether with a polar terminal group and perfluoroalkylpolyether without a polar terminal group on the surfaces.

10 Claims, No Drawings

MAGNETIC RECORDING MEDIA

BACKGROUND OF THE INVENTION

This invention relates to magnetic recording media, and more particularly to magnetic recording media such as magnetic disks, magnetic drums, magnetic tapes and magnetic cards.

Generally, magnetic recording media have a magnetic layer on various substrates, and the surface of the magnetic layer is exposed to friction by a magnetic head, etc. during the read-write process. Reduction in the properties due to the wear of magnetic layer caused by the friction is a serious problem.

It is the ordinary expedient to provide a lubricating material on the surface of a magnetic layer to give a wear resistance to the magnetic recording medium. The lubricating material so far used includes silicone oil, higher fatty acids, fluorinated oil, etc., among which it is known that perfluoroalkylpolyether (which will be hereinafter referred to as PFPE) as fluorinated oil has distinguished properties. For example, it is disclosed in U.S. Pat. No. 3,778,308 to K. G. Roller that PFPE is a preferable lubricant for the magnetic recording media. Recently, PFPE with the improved terminal structure has been proposed as a lubricant. For example, PFPE with a polar terminal group has been so far known (U.S. Pat. No. 3,847,978 to D. Sianesi, etc.), and use of PFPE with such a polar terminal group as a lubricant having a high adhesiveness to magnetic recording media and being incapable of being removed by cleaning agents such as isopropyl alcohol has been proposed (U.S. Pat. No. 4,268,556).

Indeed, some increase in the wear resistance by using the conventional lubricants including the PFPE-based lubricant can be recognized, but a higher improvement in the wear resistance is still in demand.

SUMMARY OF THE INVENTION

An object of the present invention is to provide improved magnetic recording media, and this and other objects of the present invention can be attained with a magnetic recording medium having polar perfluoroalkylpolyether with a polar terminal group and nonpolar perfluoroalkylpolyether without any polar group on the surface of a magnetic layer.

DETAILED DESCRIPTION OF PREFERRED EMBODIMENTS

It is well known that a material that is liable to adhere to a body to be exposed to friction and liable to undergo shearing in the direction of friction can work as an effective lubricant to give a wear resistance to the body.

When the conventional nonpolar or polar PFPE lubricant is applied alone to a magnetic recording medium, the disadvantage of nonpolar PFPE is that a lubricating film of low friction that is liable to undergo shearing can be formed but its adhesiveness to the magnetic recording medium is low owing to the absence of the polar groups, whereas the disadvantage of polar PFPE is that it can be strongly adsorbed onto the magnetic recording medium through the polar groups, but the lubricating film thus formed less undergoes shearing owing to the interaction between the polar groups than the lubricating film formed from the nonpolar PFPE.

The present magnetic recording media are characterized by using a lubricant mixture of polar PFPE and nonpolar PFPE. The present lubricating film on a magnetic recording medium comprises a layer of polar PFPE strongly bonded to the magnetic recording medium, which works as an effective protective layer, and a layer mainly of nonpolar PFPE formed thereon, which is liable to undergo shearing and has a low friction, and thus has a higher protective action than that of the conventional lubricating film, giving a magnetic recording medium with a high wear resistance.

The structure of the present lubricating film will be described in detail below.

The present lubricant has a skeleton of PFPE comprising basic units of $-(C_kF_{2k}O)-$ where $k =$ an integer of 1 to 3, for example, $-(CF_2O)-$, $-(CF_2CF_2O)-$, $-(CF(CF_3)CF_2O)-$, etc. Specifically, such a structure as $F-(C_kF_{2k}O)_n C_lF_{2l}-X$ can be mentioned, where k is an integer of 1 to 3; l is an integer of 1 to 2, n is an integer; X is a fluorine atom in the case of nonpolar PFPE, and a polar group such as $-COOCH_3$, $-COOH$, $-COOM'$ (where M is a monovalent metal), $-CH_2OH$,

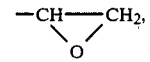

$-CONH_2$, etc in the case of polar PFPE. The PFPE has a molecular weight of about 1,000 to about 20,000, and a preferable lubricating film can be formed from PFPE in the said molecular weight range.

The present lubricant can be applied to a magnetic recording medium, for example, by spraying a solution of polar PFPE and nonpolar PFPE in 1,1,2-trichlorotrifluoroethane or the like as a lubricant onto the surface of a magnetic recording medium, and then wiping out excess lubricant with a gauze tape, etc, thereby forming a uniform lubricating film, or by vapor-depositing polar PFPE and nonpolar PFPE on the surface of a magnetic recording medium, thereby forming a lubricating film.

The amount of deposited lubricant and ratio of nonpolar PFPE to polar PFPE can be determined by measuring differential spectra by FT-IR (Fourier transform infrared spectroscopy) between the non-applied medium and the lubricant-applied medium. It is desirable that the thickness of a lubricating film is as small as possible, when the spacing loss of electrical output is taken into account and is not more than about 100 mg/m² in terms of the weight of deposited lubricant. Furthermore, it is preferable that the amount of deposited lubricant is at least about 10 mg/m² to fully cover the surface of magnetic recording medium. That is, it is desirable that total of polar and nonpolar PFPE lubricants is at least 10 mg/m².

Ratio of non-polar PFPE lubricant to polar PFPE lubricant is desirably 0.5 to 4:1 by weight, because, if the polar PFPE is used in a smaller proportion, the protective layer adhesive to the magnetic medium is hard to obtain, whereas, if the polar PFPE is used in a larger proportion, the internal friction of the lubricating film will be larger, as will be described in detail in Examples which follow.

Magnetic recording media for use in the present invention include those whose magnetic layer is a magnetic metallic film of Co-Ni alloy, Co-Cr alloy, Co-Fe alloy, or Co-P alloy, or whose magnetic layer contains magnetic oxide powders of $\gamma$-$Fe_2O_3$, Co-containing $Fe_2O_3$, $Fe_3O_4$, Co-containing $Fe_3O_4$ or $CrO_2$ or magnetic metal powders of Fe, Co, or Ni, or their alloys.

The present invention will be described in detail, referring to Examples.

EXAMPLES 1-6

Magnetic coating disks (diameter: 5 inches) prepared from a dispersion of magnetic powders ($\gamma$-$Fe_2O_3$) in a thermosetting binder comprising epoxy resin, phenol resin and polyvinylbutyral as magnetic recording media were washed with 1,1,2-trichlorotrifluoroethane, and then coated with lubricating compositions given in Table 1 at about 30 mg/m$^2$ in the following manner to obtain magnetic disks with a lubricant layer. Coating of lubricating compositions was carried out according to a spray-coating material, i.e. by spraying a 0.5 wt.% solution of the lubricating composition in 1,1,2-trichlorotrifluoroethane onto a magnetic disk at about 500 mg/m$^2$, and wiping out the excess lubricating composition with a gauze tape until the lubricating composition on the magnetic disk has the predetermined weight, while rotating the sprayed magnetic disk at 1,500 rpm. The weight of lubricating composition coating and the composition ratio were determined by differential spectrum of FT-IR.

$$F(CF(CF_3)\text{-}CF_2O)_nCF_2CF_3 \quad (I)$$

(average molecular weight: 4,500)

$$F_3CO(C_2F_4O)_m(CF_2O)_nCF_3 \quad (II)$$

(average molecular weight: 8,000; m/n $\approx$ 1)

$$F(CF(CF_3)\text{-}CF_2O)_nCF(CF_3)COOCH_3 \quad (III)$$

(average molecular weight: 4,500)

$$F(CF(CF_3)\text{-}CF_2O)_nCF(CF_3)COOH \quad (IV)$$

(average molecular weight: 4,500)

$$F(CF(CF_3)\text{-}CF_2O)_nCF(CF_3)COONa \quad (V)$$

(average molecular weight: 4,500)

To evaluate the durability of the magnetic recording media, sliding strength by the thus prepared magnetic disks was determined by subjecting the magnetic disk to repetitions of sliding at a sliding speed of 10 m/sec with an $\alpha$-alumina slider (spherical slider with the radius of curvature of 30 mm) under a load of 20 g and measuring number of repetitions of sliding until a scar appears on the surface of the magnetic recording medium. The test substantially corresponds to CS/S (contact, start and stop) sliding test.

EXAMPLES 7-11

Magnetic coating disks prepared in the same manner as in Examples 1-6 were coated with two kinds of PFPE lubricants used in Example 2 by changing the proportion in the coating weights of the lubricants without changing the total coating weight of about 30 mg/m$^2$, and subjected to the sliding test in the same manner as in Examples 1-6 to evaluate the sliding strength. Results are shown in Table 2.

COMPARATIVE EXAMPLES 1-5

Magnetic coating disks prepared in the same manner as in Examples 1-11 were coated with one kind of PFPE lubricant given in Table 1 with the coating weight of about 30 mg/m$^2$, and subjected to the sliding test in the same manner as in Examples 1-11 to evaluate the sliding strength.

As is obvious from Table 1, the magnetic disks with a coating of the polar and nonpolar PFPE lubricants in mixture had a considerably increased sliding strength on the whole, as compared with the magnetic disks with a single coating of polar or nonpolar PFPE lubricant.

As is obvious from Table 2, the sliding strength was considerably increased particularly in a ratio of nonpolar PFPE lubricant to polar PFPE lubricant in the coating of about 0.5-4:1 by weight, and a lubricating film prepared from compositions within the said ratio range was found to be preferable. Substantially same results were obtained from compositions of other polar and nonpolar PFPE lubricants in different coating weights.

TABLE 1

| Example No. and Comparative Example No. | Lubricant and Composition | Coating weight (mg/m$^2$) | Sliding strength (No. of repetitions, $\times 10^3$) |
| --- | --- | --- | --- |
| Ex. 1 | Mixture of compounds (I) and (III) (1:1 by weight) | 30 | 18.3 |
| Ex. 2 | Mixture of compounds (I) and (IV) (1:1 by weight) | 35 | 19.2 |
| Ex. 3 | Mixture of compounds (I) and (V) (1:1 by weight) | 30 | 39.2 |
| Ex. 4 | Mixture of compounds (I) and (III) (1:1 by weight) | 29 | 20.1 |
| Ex. 5 | Mixture of compounds (II) and (IV) (1:1 by weight) | 32 | 23.5 |
| Ex. 6 | Mixture of compounds (II) and (V) (1:1 by weight) | 34 | 46.2 |
| Comp. Ex. 1 | Compound (I) | 30 | 2.8 |
| Comp. Ex. 2 | Compound (II) | 32 | 3.0 |
| Comp. Ex. 3 | Compound (III) | 28 | 4.6 |
| Comp. Ex. 4 | Compound (IV) | 30 | 4.8 |
| Comp. Ex. 5 | Compound (V) | 29 | 15.2 |

The magnetic recording media used in these Examples and Comparative Examples were magnetic coating disks.

TABLE 2

| Example and Comparative Example No. | Lubricant and composition | | Total coating weight (mg/m$^2$) | Sliding strength (No. of repetitions, $\times 10^3$) |
| --- | --- | --- | --- | --- |
| | Coating weight of compound (I) (mg/m$^2$) | Coating weight of compound (IV) (mg/m$^2$) | | |
| Ex. 7 | 25 | 4 | 29 | 4.7 |
| Ex. 8 | 24 | 6 | 30 | 10.4 |
| Ex. 9 | 20 | 12 | 32 | 22.4 |
| Ex. 10 | 10 | 20 | 30 | 15.3 |
| Ex. 11 | 5 | 24 | 29 | 6.7 |
| Comp. Ex. 1 | 30 | 0 | 30 | 2.8 |

TABLE 2-continued

| Example and Comparative Example No. | Lubricant and composition | | Total coating weight (mg/m$^2$) | Sliding strength (No. of repetitions, × 10$^3$) |
| --- | --- | --- | --- | --- |
| | Coating weight of compound (I) (mg/m$^2$) | Coating weight of compound (IV) (mg/m$^2$) | | |
| Comp. Ex. 4 | 0 | 30 | 30 | 4.8 |

The magnetic recording media used in these Examples and Comparative Examples were magnetic coating disks.

EXAMPLES 12–17

Magnetic disks were prepared by forming a 0.3 μm-thick magnetic metallic film of Co-Cr on a glass substrate by RF sputtering in an Ar gas as magnetic recording media, and coated with lubricants given in Table 3 in the coating weight of about 30 mg/m$^2$ to obtain test pieces. The test pieces were subjected to determination of sliding strength in the same manner as in Examples 1–6. Results are shown in Table 3.

EXAMPLES 18–22

Magnetic thin film disks of Co-Cr prepared in the same manner as in Examples 12–17 were coated with two kinds of PFPE lubricants used in Example 13 by changing the proportion in the coating weights of the lubricants without changing the total coating weight of about 30 mg/m$^2$, and subjected to the sliding test in the same manner as in Examples 1–6 to evaluate the sliding strength. Results are shown in Table 4.

COMPARATIVE EXAMPLES 6–10

Single PFPE lubricants shown in Table 3 were applied to the surfaces of Co-Cr magnetic media prepared in the same manner as in Examples 12–22, and the resulting test pieces were subjected to the sliding test in the same manner as in Examples 12–22 to evaluate the sliding strength. Results are shown in Table 3.

As is obvious from Table 3, the magnetic Co-Cr disks with a coating of the polar and nonpolar PFPE lubricants in mixture had a considerably increased sliding strength on the whole, as compared with the magnetic disks with a single coating of polar or nonpolar PFPE lubricant, as in the case of the magnetic coating disks.

As is obvious from Table 4, the sliding strength was considerably increased particularly in a ratio of nonpolar PFPE lubricant to polar PFPE lubricant in the coating of about 0.5–4:1 by weight, and a lubricating film prepared from compositions within the said ratio range was found to be preferable, as in the case of the magnetic coating disks. Substantially same results were obtained from compositions of other polar and nonpolar PFPE lubricants in different coating weights.

TABLE 3

| Example No. and Comparative Example No. | Lubricant and Composition | Coating weight (mg/m$^2$) | Sliding strength (No. of repetitions, × 10$^3$) |
| --- | --- | --- | --- |
| Ex. 12 | Mixture of compound (I) and compound (III) (1:1 by weight) | 30 | 11.7 |
| Ex. 13 | Mixture of compound (I) and compound (IV) (1:1 by weight) | 30 | 11.5 |
| Ex. 14 | Mixture of compound (I) and compound (V) (1:1 by weight) | 29 | 32.7 |
| Ex. 15 | Mixture of compound (II) and compound (III) (1:1 by weight) | 29 | 13.2 |
| Ex. 16 | Mixture of compound (II) and compound (IV) (1:1 by weight) | 30 | 16.1 |
| Ex. 17 | Mixture of compound (II) and compound (V) (1:1 by weight) | 28 | 42.3 |
| Comp. Ex. 6 | Compound (I) | 27 | 1.0 |
| Comp. Ex. 7 | Compound (II) | 31 | 1.2 |
| Comp. Ex. 8 | Compound (III) | 30 | 2.3 |
| Comp. Ex. 9 | Compound (IV) | 32 | 2.5 |
| Comp. Ex. 10 | Compound (V) | 27 | 9.2 |

The magnetic recording media used in these Examples and Comparative Examples were magnetic disks with a Co-Cr magnetic thin film.

TABLE 4

| Example and Comparative Example No. | Lubricant and composition | | Total coating weight (mg/m$^2$) | Sliding strength (No. of repetitions, × 10$^3$) |
| --- | --- | --- | --- | --- |
| | Coating weight of compound (I) (mg/m$^2$) | Coating weight of compound (IV) (mg/m$^2$) | | |
| Ex. 18 | 25 | 3 | 28 | 2.3 |
| Ex. 19 | 25 | 7 | 32 | 10.5 |
| Ex. 20 | 21 | 11 | 32 | 13.5 |
| Ex. 21 | 11 | 20 | 31 | 11.0 |
| Ex. 22 | 4 | 26 | 30 | 4.3 |
| Comp. Ex. 6 | 27 | 0 | 27 | 1.0 |
| Comp. Ex. 9 | 0 | 32 | 32 | 2.5 |

The magnetic recording media used in these Examples and Comparative Examples were magnetic disks with a Co-Cr magnetic thin film.

As is obvious from the foregoing Examples and Comparative Examples, the present magnetic recording media have a distinguished durability. Beside the magnetic coating recording media and Co-Cr-sputtered metal magnetic recording media shown in the foregoing Examples, magnetic metal films, etc. formed by plating or vapor deposition had the similar effect. Substantially same effects were obtained with other nonpolar and polar PFPE lubricants other than those shown in the foregoing Examples.

What is claimed is:

1. Magnetic recording medium having a lubricating film thereon which comprises a lubricating film containing polar perfluoroalkylpolyether with a polar terminal group and a nonpolar perfluoroalkylpolyether without a polar terminal group being laid on the surface of a magnetic recording medium having a magnetic layer comprising a film formed of a material selected from the group consisting of a magnetic metal, a magnetic oxide and magnetic powders dispersed in a thermosetting binder; a coating weight of the polar and non-polar perfluoroalkylpolyethers on the surface of the magnetic recording medium being 10 to 100 mg/m², and a ratio of coating weight of the nonpolar perfluoroalkylpolyether to that of the polar perfluoroalkylpolyether being 0.5–4:1.

2. Magnetic recording medium having a lubricating film thereon according to claim 1, wherein the magnetic layer comprises magnetic powders dispersed in a thermosetting binder.

3. Magnetic recording medium having a lubricating film thereon according to claim 1, wherein the skeleton structure of the polar perfluoroalkylpolyether is represented by at least one of the general formulae: $-(CF_2O)-$, $-(C_2F_4O)-$ and $-(CF(CF_3).CF_2O)-$.

4. Magnetic recording medium having a lubricating film thereon according to claim 1, wherein the skeleton structure of the nonpolar perfluoroalkylpolyether is represented by at least one of the general formulae: $-(CF_2O)-$, $-(C_2F_4O)-$ and $-(CF(CF_3).CF_2O)-$.

5. Magnetic recording medium having a lubricating film thereon according to claim 1, wherein the magnetic recording medium is a magnetic disk.

6. Magnetic recording medium having a lubricating film thereon according to claim 1, wherein the magnetic recording medium is a magnetic disk having a magnetic layer comprising a film prepared from a dispersion of magnetic powder in a binder comprising epoxy resin, phenol resin and polyvinylbutyral.

7. Magnetic recording medium having a lubricating film thereon according to claim 1, wherein the magnetic recording medium is a magnetic disk having a magnetic layer comprising a film formed of a magnetic metal.

8. Magnetic recording medium having a lubricating film thereon according to claim 1, wherein the structure of the polar perfluoroalkylpolyether is represented by the formula: $F-(C_kF_{2k}O)_{\overline{n}}C_lF_{2l}-X$, where k is an integer from 1 to 3; l is an integer from 1 to 2, n is an integer, and X is a polar group selected from the group consisting of $-COOCH_3$, $-COOH$, $-COOM'$ wherein M is a monovalent metal, $-CH_2OH$,

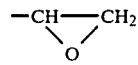

and $CONH_2$.

9. Magnetic recording medium having a lubricating film thereon according to claim 1, wherein the structure of the nonpolar perfluoroalkylpolyether is represented by the formula: $F-(C_kF_{2k}O)_{\overline{n}}C_lF_{2l}-X$, where k is an integer from 1 to 3; l is an integer from 1 to 2, n is an integer, and X is a fluorine atom.

10. Magnetic recording medium having a lubricating film thereon which comprises a lubricating film containing polar perfluoroalkylpolyether with a polar terminal group and a nonpolar perfluoroalkylpolyether without a polar terminal group, being laid on a surface of a magnetic recording medium having a magnetic layer comprising a film formed of a material selected from the group consisting of a magnetic metal, a magnetic oxide and magnetic powders dispersed in a thermosetting binder; a ratio of coating weight of the nonpolar perfluoroalkylpolyether to that of the polar perfluoroalkylpolyether being in a range such that a protective layer adhesive to the magnetic medium is obtained and a sliding strength is achieved which is greater than that obtained by the use of either polar or nonpolar perfluoroalkylpolyether alone.

* * * * *